United States Patent Office 3,477,932
Patented Nov. 11, 1969

3,477,932
LASER RADIATION-INDUCED POLYMERIZATION
Leo P. Parts, Dayton, and William R. Feairheller, Jr., Kettering, Ohio, assignors to Monsanto Research Corporation, St. Louis, Mo., a corporation of Delaware
No Drawing. Filed Nov. 13, 1967, Ser. No. 682,581
Int. Cl. C08f 1/16; C08d 1/00
U.S. Cl. 204—159.23         6 Claims

ABSTRACT OF THE DISCLOSURE

Process for the polymerization of acrylamide or alkali metal acrylates by irradiation of an aqueous solution containing the monomer, a photosensitizer and a co-catalyst with an argon laser.

BACKGROUND OF THE INVENTION

This invention pertains to the polymerization of homopolymers from monomeric ethylenically unsaturated amides or acids as their alkali metal salts, and more particularly to the argon laser radiation-induced polymerization of acrylamide or alkali metal salts of acrylic acid in the presence of photosensitizers and co-catalysts.

SUMMARY OF THE INVENTION

We have found that argon laser radiation of 4880 A. wavelength will induce polymerization of acrylamide or alkali metal acrylates in aqueous solution in the presence of specific sensitizers and co-catalysts with high quantum efficiency and without depletion of the sensitizer. The polyacrylamide thus formed has a weight average molecular weight of about $4 \times 10^6$ and is useful for erosion stabilization of soils, as a peptizer for photographic emulsions, as a flocculant for filler retention in paper, and for other related uses. Other uses are for in situ formation of sizes, formation of photographic images, microencapsulation, formation of photoresists, and other applications in which the unique collimation- and coherence-characteristics of the laser beam may be utilized. Thus, polymerization reactions can be initiated from remote positions; sharp image definition can be attained when the polymerizations are utilized as photographic processes or for photoresist production. Furthermore, polymeric images of very small cross-sections can be produced by focusing the beam. By carrying out the polymerization of acrylamide or alkali metal acrylate in the presence of a cross-linking agent, e.g. N,N'-methylene-bisacrylamide or calcium acrylate, a cross-linked insoluble polymer is formed.

Sodium or potassium polyacrylates formed by this process are useful for soil conditioners, as leveling agents for pigment dispersions, for the aggregation of clay suspensions, and similar uses.

According to the present invention there is provided a method of polymerizing an unsaturated monomer selected from the group consisting of acrylamide and alkali metal acrylates wherein the alkali metal is selected from the group consisting of sodium and potassium which comprises exposing an aqueous solution of the monomer to the radiation from an argon laser in the presence of a photosensitizer selected from the group consisting of eosin and 4',5'-dibromofluorescein, and a co-catalyst selected from the group consisting of N,N,N',N'-tetramethylethylenediamine, N,N,N',N",N" - pentamethyldiethylenetriamine and 1-allyl-2-thiourea, and recovering a polymeric product.

It is an object of the present invention to provide a process for preparing polyacrylamide or potassium polyacrylate.

Suitable photosensitizers include eosin, 4',5'-dibromofluorescein and $\alpha,\beta,\gamma,\delta$ - tetraphenylporphine; suitable co-catalysts include N,N,N',N' - tetramethylethylenediamine, N,N,N',N",N" - pentamethyldiethylenetriamine and 1-allyl-2-thiourea. Normally the photosensitizers are effective in concentrations of less than $1 \times 10^{-3}$ moles/liter, even as low as $1 \times 10^{-5}$ moles/liter; the co-catalysts are effective in concentrations of less than $1 \times 10^{-1}$ moles/liter and preferably are used at about $1 \times 10^{-2}$ moles/liter. The photosensitizer functions as an energy transfer agent and does not constitute an essential element of the polymerization-initiating species.

The concentration of monomer in aqueous solution is not critical, and it may be 10 to 95% by weight of the solution. For ease of recovery of the product, the preferable concentration is about 25 to 50% by weight.

For purposes of cross-linking, there are added amounts of cross-linking agent, e.g. N,N'-methylene-bisacrylamide or calcium acrylate, up to about 50% of the weight of monomer.

The solution of the monomer may or may not be stirred during exposure to the laser beam, but for high quantum efficiency it is preferably stirred rapidly.

The presence of oxygen is necessary for the polymerization reaction, but there preferably should be less than 0.1% oxygen in the atmosphere in contact with the irradiated solution.

The intensity of the incident laser beam may be varied, preferably being less than 1 watt/cm.$^2$ for high effective quantum efficiency (i.e. the number of molecules polymerized per quantum absorbed). The beam may also be interrupted by a suitable device, e.g., a beam chopper or sector wheel, to improve the quantum efficiency.

DESCRIPTION OF THE PREFERRED EMBODIMENTS

The invention is further illustrated by, but not limited to, the following examples.

EXAMPLE 1

An argon laser system was used to provide coherent radiation of 4880 A. wavelength. There was used a CW argon laser, Raytheon Model LG 12, providing one watt of total power output at about 11.5 amperes and 320 volts D.C. At a current of 7.5 amperes the beam was substantially pure 4880 A. radiation, having an energy of about 70 milliwatts or an incident energy flux of about $1.72 \times 10^{17}$ quanta/sec. In this example the diameter of the beam was 2 mm., so that the radiation flux density was about 2.2 watts/cm.$^2$ or about $5.45 \times 10^{18}$ quanta/cm.$^2$ sec.

The sample of monomeric acrylamide in solution, together with sensitizer and co-catalyst, was irradiated with the beam in a rectangular cell of 5 ml. capacity, having 2 cm. light path. The cell was placed in a black box, equipped with a camera shutter. The beam was allowed to traverse the cell containing the solution for a desired length of time, and the transmitted energy flux was measured with a laser thermopile.

5 ml. of solution containing 1.25 grams of acrylamide (recrystallized from toluene) in water together with an amount of eosin as photosensitizer corresponding to $1 \times 10^{-5}$ moles/liter and an amount of 1-allyl-2-thiourea as co-catalyst corresponding to $1 \times 10^{-2}$ moles/liter, was irradiated for 10 minutes. During this time the solution was exposed to the air and was not stirred. The resulting very viscous solution was poured into methanol to precipitate the polymer, which was filtered off, dried and weighed. The weight of polymer was 0.3206 gram. The weight average molecular weight, as determined by viscosity measurements, was $4.1 \times 10^6$. The structure was confirmed by infrared spectroscopy by comparison with the Sadtler Index.

EXAMPLE 2

In this example the beam diameter was expanded optically to 8 mm., so that the radiation flux density was about 0.11 watts/cm.$^2$ with an incident energy flux of about $1.37 \times 10^{17}$ quanta/sec. The atmosphere over the solution was varied.

Separate samples containing 2.50 grams of acrylamide in 5 ml. aqueous solution, together with an amount of 4',5'-dibromofluorescein as photosensitizer corresponding to $2 \times 10^{-5}$ moles/liter and an amount of N,N,N',N'-tetramethylethylenediamine as co-catalyst corresponding to $7.2 \times 10^{-3}$ moles/liter, were irradiated for 3 minutes. The 4880 A. laser beam was expanded to 8 mm. by two lenses: a concave lens of 5 cm. focal length and a convex lens of 30 cm. focal length. Prior to exposure, the solution was saturated with gas of the indicated composition by bubbling the gas through the solution for 10 minutes. During the exposure the solution was stirred rapidly. The atmosphere was nitrogen containing the indicated percentage of oxygen.

|   | Atmosphere, Percent O$_2$ | Induction time, sec. | Temperature Rise, ° C. | Weight of Polymer, mg. |
|---|---|---|---|---|
| A | 20 | 90 | 11.0 | 634 |
| B | 1.0 | 60 | 12.0 | 484 |
| C | 0.5 | 20 | 11.5 | 654 |
| D | 0.1 | 10 | 12.0 | 411 |

EXAMPLE 3

In this example the oxygen concentration was again varied, using a lower incident energy flux than in Example 2.

Separate samples containing 2.40 grams of acrylamide in 5 ml. aqueous solution, together with an amount of 4',5'-dibromofluorescein as photosensitizer corresponding to $2 \times 10^{-5}$ moles/liter and an amount of N,N,N',N'-tetramethylethylenediamine as co-catalyst corresponding to $7.2 \times 10^{-3}$ moles/liter, were irradiated with 4880 A. coherent radiation for specified times. The solution was stirred rapidly during exposure. The atmosphere was nitrogen containing the indicated percentage of oxygen.

EXAMPLE 4

In this example potassium acrylate was polymerized. Samples containing from 1.0 to 3.0 g. of potassium acrylate in 5 ml. aqueous solution, together with 4',5'-dibromofluorescein (at $2 \times 10^{-5}$ moles/liter concentration) and N,N,N',N'-tetramethylethylenediamine (at $1 \times 10^{-2}$ moles/liter concentration), were irradiated for specified times at a radiation flux density of the 4880 A. beam of about 2.2 watts/cm.$^2$. The solution was stirred rapidly under a nitrogen atmosphere of less than 0.1% oxygen content. The polymer was obtained by precipitating in an HCl-methanol solution.

|   | Monomer, g. | Irradiation time, sec. | Induction time, sec. | Temp. rise, ° C. | Weight of polymer, mg. | Effective Quantum Efficiency |
|---|---|---|---|---|---|---|
| J | 1.0 | 60 | 20 | 1.5 | 265 | 530 |
| K | 2.0 | [1] 20 | 6 | 4.5 | 234 | 10,400 |
| L | 3.0 | [2] 166 | 12 | 10.4 | 534 | 24,200 |

[1] In experiment K, a 1:6 sector wheel was used to reduce the actual exposure time to one-sixth of the given value.
[2] In experiment L, a 1:50 sector wheel was used to reduce the actual exposure time to one-fiftieth of the given value.

It is to be understood that although the invention has been described with specific reference to particular embodiments thereof, it is not to be so limited since changes and alterations therein may be made which are within the full intended scope of this invention as defined by the appended claims.

What we claim is:

1. A method of polymerizing an unsaturated monomer selected from the group consisting of acrylamide and alkali metal acrylates wherein the alkali metal is selected from the group consisting of sodium and potassium, which comprises exposing an aqueous solution of the monomer to the radiation from an argon laser in the presence of a photosensitizer selected from the group consisting of eosin and 4',5'-dibromofluorescein, and a co-catalyst selected from the group consisting of N,N,N',N'-tetramethylethylenediamine and N,N,N',N'',N''-pentamethyldiethylenetriamine, and recovering a polymeric product.

2. The method of claim 1 wherein the monomer is acrylamide.

3. The method of claim 1 wherein the monomer is potassium acrylate.

4. The method of claim 1 wherein the monomer is acrylamide the photosensitizer is eosin and the co-catalyst is N,N,N',N'-tetramethylethylenediamine.

5. The method of claim 1 wherein the monomer is acrylamide, the photosensitizer is 4',5'-dibromofluorescein and the co-catalyst is N,N,N',N'-tetramethylethylenediamine.

6. The method of claim 1 wherein the monomer is potassium acrylate, the photosensitizer is 4',5'-dibromofluorescein and the co-catalyst is N,N,N',N'-tetramethylethylenediamine.

(References on following page)

|   | Atmosphere, percent O$_2$ | Irradiation time, min. | Incident energy flux, quanta/sec. | Induction time, sec. | Temp. rise, ° C. | Weight of polymer, mg. |
|---|---|---|---|---|---|---|
| E | 0.5 | 3.0 | $5.4 \times 10^{16}$ | 145 | 5 | 146 |
| F | 0.13 | 3.0 | $5.4 \times 10^{16}$ | 30 | 13.5 | 398 |
| G | 0.13 | [1] 5.5 | $9.8 \times 10^{15}$ | 150 | 3.3 | 243 |
| H | <0.10 | [1] 5.0 | $9.8 \times 10^{15}$ | 60 | 7.5 | 390 |

[1] In experiments G and H, a 1:6 sector wheel was used to reduce the exposure time to one-sixth of the given value.

References Cited

UNITED STATES PATENTS 3,097,096  7/1963  Oster _____ 204—159.23

OTHER REFERENCES

D'Haenens et al., Lasers and Their Applications, Journal of the SMPTE, November 1962, vol. 71, pp. 828–832.

MURRAY TILLMAN, Primary Examiner
RICHARD B. TURER, Assistant Examiner

U.S. Cl. X.R.

96—48, 90, 115